United States Patent
Goell

[11] 4,000,416
[45] Dec. 28, 1976

[54] MULTI-CORE OPTICAL COMMUNICATIONS FIBER

[75] Inventor: James E. Goell, Roanoke, Va.
[73] Assignee: International Telephone and Telegraph Corporation, Nutley, N.J.
[22] Filed: July 11, 1975
[21] Appl. No.: 595,247
[52] U.S. Cl. .............................. 250/199; 350/96 R; 350/96 WG; 340/380
[51] Int. Cl.$^2$ .................................... H04B 9/00
[58] Field of Search .............. 250/199; 331/94.5 D; 350/96 R, 96 WG; 340/380

[56] References Cited
UNITED STATES PATENTS

| | | | |
|---|---|---|---|
| 3,445,785 | 5/1969 | Koester et al. | 250/199 UX |
| 3,535,017 | 10/1970 | Miller | 250/199 X |
| 3,583,786 | 6/1971 | Marcatili | 350/96 WG |
| 3,636,473 | 1/1972 | Young | 331/94.5 D UX |
| 3,700,900 | 10/1972 | Herleikson | 250/99 |
| 3,865,466 | 2/1975 | Slaughter | 350/96 WG X |

*Primary Examiner*—John W. Caldwell
*Assistant Examiner*—William M. Wannisky
*Attorney, Agent, or Firm*—John T. O'Halloran; Peter C. Van Der Sluys; Richard A. Menelly

[57] ABSTRACT

Methods and apparatus are disclosed for providing a multipath optical communications system within a single fiber. One embodiment comprises a concentric multi-core optical fiber having an inner core for transmitting information and an outer core for transmitting a security signal. Attempted access to the inner core causes a decrease in the security signal intensity alerting the operator to the attempted intrusion.

16 Claims, 4 Drawing Figures

MULTI-CORE OPTICAL COMMUNICATIONS FIBER

BACKGROUND OF THE INVENTION

The advent of optical fibers for communication purposes was first thought to provide ready means for transmitting secret information without elaborate security precautions. Access to the information was considered impossible since the fiber would have to be broken in the process. Several ingenious methods for gaining access to the fiber core without breaking the fiber have evolved since the first early optical communication systems were devised.

One method for gaining access to information transmitted within the fiber core consists of etching away a portion of the optical cladding material and coupling into the light path by submersing the fiber in a material of high refractive index. By this method light would readily transmit from the fiber core through the high index of refraction material where it could be optically received and monitored. Since this method of tapping light energy could be detected at the optical receiver end of the communications system, various methods were required for encoding the information data in order to preserve the system's security.

The use of complex encoding equipment and circuitry at the optical transmitter end and the use of similar decoding apparatus at the optical receiver end adds to the large quantity of communications equipment employed within the optical communication system. The purpose of this invention, therefore, is to disclose methods and apparatus for providing a simple and effective secured optical communications system.

SUMMARY OF THE INVENTION

A multiple core optical fiber provides secured information transmission by transmitting the secret information within an inner core and transmitting a security signal through an outer core. An intermittent cladding layer of lower index material prevents an intermixing between the secret information and the security signal. Attempted access to the inner core causes a decrease in the intensity of the security signal to alert an operator to the attempted intrusion.

DESCRIPTION OF THE PREFERRED EMBODIMENT

Figure 1:
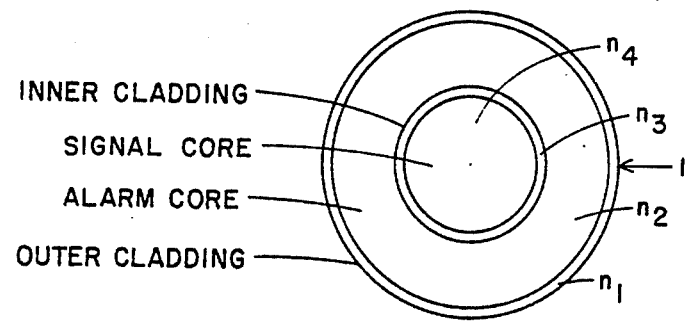
FIG. 1 is a cross-section of the concentric multiple core optical fiber of this invention.

FIG. 1 is a cross-section of the concentric multi-core fiber 1 of this invention which can be made by standard optical fiber processing techniques.

One method for forming the multi-core fiber could consist in the successive application of a number of layers of material by the process known as chemical vapor deposition. Here alternate layers of high and low index of refraction material could be deposited on the inner surface of a silica tube. The material contributing to the higher index region would be germania-silica glass, for example, and the material contributing to the lower index of refraction would be borosilicate glass.

Another method for forming the multi-core fiber of this invention would be the insertion of a number of concentric cylinders within an outer silica tube. The material of the cylinder could alternately consisting of high index material, such as germania-silica, and low index material such as borosilicate glass as described above.

A further method for providing the multiple core fiber of this invention is simply to surround a conventional glass optical fiber, having a germania silicate core, a borosilicate cladding and a silica outer tube, with an outer cladding layer of low index plastic. The silica, having a higher index of refraction than the fiber cladding layer or plastic coating, would contain the signal within the glass optical fiber silica layer which effectively could then be a concentric core.

An alternate method for forming the concentric multi-core fiber of this invention is to alternately deposit successive high and low index of refraction plastic material.

The fiber consists of a central core herein designated as a "signal core" of a material having an index of refraction $n_4$. An inner cladding layer of an index of refraction $n_3$ completely encloses the signal core for confining light energy within the signal core by the method of complete internal refraction since $n_3$ is chosen less than $n_4$. The combination of the signal core of refractive index $n_4$ and the inner cladding layer of refractive index $n_3$ constitutes an optical fiber similar to the optical fibers of the prior art. A second core designated as an "alarm core" is concentrically applied over both the inner cladding and the signal core, and consists of a material of an index of refraction $n_2$ which is slightly higher than the refractive index of the inner cladding $n_3$. The alarm core is surrounded by an outer cladding layer having a refractive index $n_1$ which is slightly less than the refractive index $n_2$ of the alarm core. Light energy transmitting through the alarm core will be confined within the core since the inner cladding layer and outer cladding layer have lower indexes of refraction ($n_3$, $n_1$) than the index of refraction of the alarm core $n_2$. Since the signal core and the alarm core are optically independent from each other due to the intermittent inner cladding layer of lower refractive index $n_3$, they can, for the purpose of this disclosure, be considered as two separate and parallel light conduits. Light from one source can therefore travel through the signal core, and light from an independent source could travel through the alarm core with no interference or intermixing between the two light signals.

The concentric dual core described in FIG. 1 can be used to transfer secret information in the following manner. A modulated light signal carrying secret information can be directed through the signal core to a remote receiver at an opposite end of the multi-core fiber. Light from a separate source could be transmitted through the alarm core to another receiver at the opposite end of the cable. When an intruder attempts to tunnel through the outer cladding layer and through the alarm core, in an attempt to gain optical access to the signal core, the light output received through the alarm core at the opposite end of the fiber will suddenly diminish in intensity. This is brought about by the fact that the outer cladding has been at least partially removed in the process so that light normally reflected in toto from the cladding will leak out through the discontinuity in the outer cladding layer. Light passing through the alarm core will become obstructed by the presence of any implement passing through the light path consisting of the total area of the alarm core region. Light passing through the alarm core will also pass through the discontinuity in the inner cladding layer which provides an optical boundary between the alarm core and signal core for the reasons stated earlier.

Figure 2:
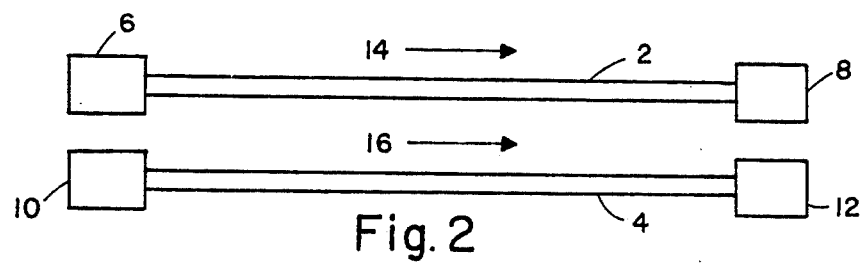
FIG. 2 is a block diagram of an optical communications system using the fibers of FIG. 1.

FIG. 2 shows an optical communications system 10 where the signal core region of the inventive fiber described in FIG. 1 is designated analagously as a communications signal path 4, and the alarm core region of the same fiber is designated as a security signal path 2. The security signal path 2 and the signal communications path 4 are described as separate light paths for the purpose of clarity only since they actually have the cross-sectional configuration shown in FIG. 1. A first optical transmitter 10 generates an information modulated light signal having the direction of arrow 16 which passes through the signal communications path 4 to the optical receiver. This is analagous to the transmission of secret information from an independent light source through the signal core of the inventive fiber of FIG. 1. A second optical transmitter 6 generates a security light signal having the direction of arrow 14 through the security signal path 2 where it is received by a second optical receiver 8. The security signal path 2 is analagous to the alarm core region of the aforementioned fiber of FIG. 1. While the secret information is being transmitted through the signal communications path 4 the security signal is constantly being monitored for intensity in the optical receiver 8. When a decrease is observed in the light output of the security signal at receiver 8 the operator of the optical transmitter 10 should immediately be informed of the possibility of an attempted intrusion into the security signal path 2.

Figure 3:
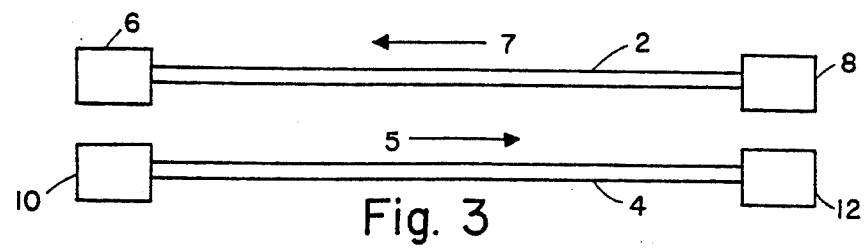
FIG. 3 is an alternate embodiment of the system of FIG. 2.

In the optical communications path of FIG. 3 the same signal core region and alarm core region of the inventive fiber of FIG. 1 are designated by the communications signal path 4 and security signal path 2 as for the system of FIG. 2. Here the direction of travel between the security signal path designated by arrow 7 is opposite to that of the signal communications path designated by arrow 5. In this embodiment the optical transmitter 10 transmitting secret information along the communications signal path 4 to the optical receiver 2 simultaneously receives a security signal from a second optical transmitter 8 by means of the second optical receiver 6. In this embodiment the operator of transmitter 10 in close proximity to receiver 6 immediately observes a decrease in the security signal originating at the second optical transmitter 8 and passing through the security signal 2. Here the operator of transmitter 10, upon learning of the possible attempted intrusion through the alarm core of the inventive fiber herein designated as security signal path 2, could then intentionally transmit erroneous information or alternatively close down transmission.

Various electro-optical devices could be employed in order to automatically cause a shut-down in the transmitter 10 upon a decrease in the light intensity of the security signal arriving at the receiver 6.

An alternate method for generating secret information through the signal core would be for the operator of transmitter 10 to first send a request for a security signal from the operator of transmitter 8, and for the operator of transmitter 8 to reply by sending a prearranged security signal through the security signal path 2 to optical receiver 6. The aforementioned operator of optical transmitter 10 would then know that the communications signal path 4 is clear for transmitting secret information. After sending the secret information through signal path 4 and by continuously monitoring the intensity of the security signal at receiver 6, observation of a decrease in the intensity at receiver 6 would be indicative of an attempt by an intruder to gain access to the secret information as described earlier.

Figure 1A:
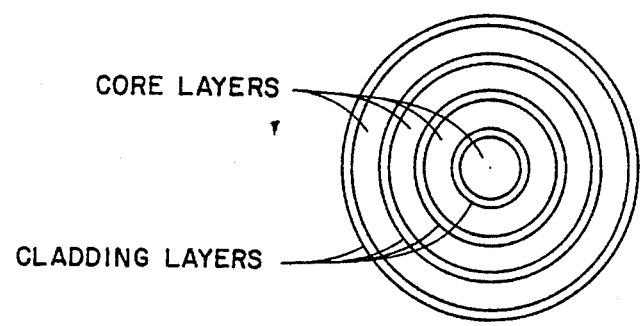
FIG. 1A shows the inventive multiple core fiber of FIG. 1 consisting of four cores.

The concentric multiple core fiber shown in FIG. 1 can have several layers of signal cores and alternate layers of alarm cores or, alternatively, could have a series of signal cores each carrying separate information along distinct optical paths which are enclosed by one encompassing alarm core for providing security to all the signal cores contained within the fiber. A fiber having several concentric and independent cores is shown, for example, in FIG. 1A.

Although the inventive concentric core fiber and security optical communications system have herein been described for secret information purposes, such as military communications, this is by way of example only and is not to be considered in any way as a limitation on the scope of this invention. The invention finds application in all types of optical communications systems where means for determining attempted intrusion upon the signal are required. One such application, for example, is in telephone communication systems utilizing optical fiber telephone lines. When an attempt is made to tap the telephone line, by removing the outer cladding to gain optical access into the inner information carrying core, the parties at both ends of the telephone line would immediately be made aware of the attempted intrusion.

What is claimed is:
1. A multiple core optical fiber comprising:
 an inner core of light transmission material having a first index of refraction;
 an inner cladding layer of light transmissive material surrounding said inner core having a second index of refraction lower than the first index of refraction for confining light energy within said inner core;
 at least one outer core of light transmissive material surrounding said inner core and cladding having an index of refraction higher than said second index of refraction; and
 at least one outer cladding layer of light transmissive material surrounding said outer core and having an index of refraction lower than said outer core for confining light energy within said outer core.
2. The fiber of claim 1 wherein said inner core and said outer core have the same index of refraction.
3. The fiber of claim 2 wherein said inner core and said outer core comprise a glass consisting of germania and silica.
4. The fiber of claim 1 wherein said inner cladding and said outer cladding having the same index of refraction.
5. The fiber of claim 4 wherein said inner cladding and said outer cladding comprise a glass consisting of silica and boron oxide.
6. The fiber of claim 1 wherein said inner core and cladding comprise glass materials and said outer core and cladding comprise plastic materials.
7. The fiber of claim 1 wherein said inner core and cladding and said outer core comprise glass materials and said outer cladding comprises a plastic material.

8. A fiber optic communication system comprising in combination:
an optical fiber having a plurality of concentric layers of alternating higher and lower index of refraction light transmissive material;
first optical transmission means for transmitting information data through one of said layers of high index material;
second optical transmission means for transmitting optical energy through another of said layers of high index material;
first optical receiver means for receiving said information data from said one layer of high index material; and
second optical receiver means for receiving said optical energy from said other layer of high index material.

9. The system of claim 8 wherein said second receiver means includes comparison means for comparing said transmitted optical energy at any time to determine any loss in said transmitted energy.

10. A method for transmitting secured information data in optical communication systems comprising the steps of:
providing a multi-layered optical communications fiber having alternate layers of high and low index of refraction light transmissive materials;
transmitting optical communication through one of said layers of high index of refraction material;
transmitting optical energy through another of said layers of high index of refraction material; and
monitoring said optical energy in said other layer to determine any loss in said optical energy.

11. The method of claim 10 wherein said other layer of material of high index of refraction concentrically encloses said one layer of high index of refraction material.

12. The method of claim 10 wherein said optical communication is transmitted through said one layer of high index of refraction material in a first direction and wherein said optical energy is transmitted through said other layer of high index of refraction material in a second direction.

13. The method of claim 11 wherein said optical communication and said optical energy are transmitted through said fiber in the same direction.

14. The method of claim 10 wherein said layers of high index material comprise a glass consisting of silica and germania.

15. The method of claim 10 wherein said layers of high index material comprise a glass consisting of silica and boron oxide.

16. The method of claim 10 wherein said one of said layers of high index of refraction material comprises glass, and said other layer of high index material comprises plastic.

* * * * *